(12) United States Patent
Si et al.

(10) Patent No.: US 11,966,145 B2
(45) Date of Patent: Apr. 23, 2024

(54) QUICK-MOUNTING STRUCTURE, ADAPTOR RING AND FILTER

(71) Applicant: PGYTECH CO., LTD., Jiangsu (CN)

(72) Inventors: Dashan Si, Jiangsu (CN); Guangshan Wang, Jiangsu (CN); Xiuzhi Yu, Jiangsu (CN)

(73) Assignee: PGYTECH CO., LTD., Jiangsu (CN)

( * ) Notice: Subject to any disclaimer, the term of this patent is extended or adjusted under 35 U.S.C. 154(b) by 410 days.

(21) Appl. No.: 17/288,826

(22) PCT Filed: Jan. 27, 2021

(86) PCT No.: PCT/CN2021/073992
§ 371 (c)(1),
(2) Date: Apr. 26, 2021

(87) PCT Pub. No.: WO2022/141712
PCT Pub. Date: Jul. 7, 2022

(65) Prior Publication Data
US 2022/0206240 A1 Jun. 30, 2022

(30) Foreign Application Priority Data
Dec. 31, 2020 (CN) .......................... 202023346677.0

(51) Int. Cl.
*G03B 11/00* (2021.01)
*G02B 7/00* (2021.01)
(Continued)

(52) U.S. Cl.
CPC .............. *G03B 11/00* (2013.01); *G02B 7/006* (2013.01); *G02B 7/022* (2013.01); *G02B 7/026* (2013.01); *G03B 17/14* (2013.01)

(58) Field of Classification Search
CPC ................................. G03B 11/00; G03B 17/14
See application file for complete search history.

(56) References Cited

U.S. PATENT DOCUMENTS

| | | | |
|---|---|---|---|
| 3,758,198 A * | 9/1973 | Kanie | G03B 17/12 |
| | | | 359/830 |
| 10,209,478 B2 * | 2/2019 | Okado | G03B 11/00 |
| 2021/0041057 A1 * | 2/2021 | Jankura | G06F 1/1632 |

FOREIGN PATENT DOCUMENTS

| | | |
|---|---|---|
| CN | 110146960 A | 8/2019 |
| CN | 210465810 U | 5/2020 |

(Continued)

OTHER PUBLICATIONS

International Search Report for the PCT Application No. PCT/CN2021/073992 issued by the International Searching Authority dated Oct. 12, 2021.

(Continued)

*Primary Examiner* — Leon W Rhodes, Jr.
(74) *Attorney, Agent, or Firm* — IP & T GROUP LLP

(57) ABSTRACT

The present disclosure relates to the technical field of adjustment and installation of photography and video recording, in particular, to a quick-mounting structure, an adaptor ring and a filter. The quick-mounting structure includes a rotating groove body, wherein the rotating groove body is provided with a sliding groove therein, a notch is provided in the side wall of the sliding groove, and the rotating groove body is provided on the first connecting member; and a stopper, wherein the stopper is provided on the second connecting member, and can get into and out of the sliding groove through the notch.

19 Claims, 8 Drawing Sheets

(51) Int. Cl.
  *G02B 7/02*   (2021.01)
  *G03B 17/14*  (2021.01)

(56) References Cited

FOREIGN PATENT DOCUMENTS

| | | | |
|---|---|---|---|
| CN | 211979398 U | | 11/2020 |
| CN | 212060840 U | * | 12/2020 |
| CN | 212060840 U | | 12/2020 |
| JP | H10-48728 A | | 2/1998 |
| TW | I684819 B | | 2/2020 |

OTHER PUBLICATIONS

Written Opinion for the International Application No. PCT/CN2021/073992 issued by the International Searching Authority dated Oct. 11, 2021.

Notification to Grant Patent Right for Invention of priority application No. CN 202023346677.0 issued by the Chinese Patent Office dated Jul. 2, 2021.

* cited by examiner

QUICK-MOUNTING STRUCTURE, ADAPTOR RING AND FILTER

CROSS-REFERENCE TO RELATED APPLICATIONS

This application is a national stage application of PCT/CN2021/073992 filed on Jan. 27, 2021, which claims priority to Chinese Patent Application No. 202023346677.0 filed with the Chinese Patent Office on Dec. 31, 2020, entitled "Quick-Mounting Structure, Adaptor Ring, and Filter", which is incorporated herein by reference in its entirety.

TECHNICAL FIELD

The present disclosure relates to the technical field of adjustment and installation of photography and video recording, in particular, to a quick-mounting structure, an adaptor ring and a filter.

BACKGROUND ART

Camera filters have always been used to improve the quality of photos and videos. Camera filters allow users to improve image quality in various settings. A camera filter must be detachably attached to the camera lens or lens shell. Most digital camera lenses have a threaded mouth for connecting the filters. The role of the filter is obvious, which can improve the image quality and protect the lens from damage. In addition, the filter is much cheaper than the lens, and can be replaced more easily.

Most of the filters in the prior art are connected to the lens with a threaded mouth. In the situation that the user only needs to open and close once or open and close for a short time, when the filter needs to be replaced repeatedly, the whole process will be cumbersome.

SUMMARY

The purpose of the present disclosure comprises, for example, providing a quick-mounting structure, an adaptor ring and a filter, which make the replacement of the filter simpler and faster.

The embodiments of the present disclosure are realized as follows:

the present disclosure provides a quick-mounting structure, which is configured to quickly connect a first connecting member (i.e., first rotary member) with a second connecting member (i.e., second rotary member), comprising:

a rotating groove body, wherein the rotating groove body is provided with a sliding groove therein, a notch is provided in the side wall of the sliding groove, and the rotating groove body is provided on the first connecting member; and a stopper, wherein the stopper is provided on the second connecting member, and can get into and out of the sliding groove through the notch.

In an optional embodiment, the sliding groove is provided with a spacing part therein, and the spacing part connects two oppositely arranged side walls of the sliding groove.

In an optional embodiment, the spacing part is provided at the two opposite sides of the notch.

In an optional embodiment, the stopper is provided with a curved surface or an inclined surface at the two opposite sides, and the stopper can stride over the spacing part by the curved surface or the inclined surface.

In an optional embodiment, the stopper is provided with a curved surface or an inclined surface on one side surface.

In an optional embodiment, the number of the notches is multiple.

In an optional embodiment, the material of the spacing part and/or the stopper is an elastic material.

In an optional embodiment, the rotating groove body comprises a rotary baffle or a rotary stop lever; and a gap is formed between the rotary baffle or the rotary stop lever and the first connecting member, and the gap is the sliding groove.

In an optional embodiment, the quick-mounting structure also comprises a first magnetic suction member provided on the first connecting member, and a second magnetic suction member provided on the second connecting member; and the first magnetic suction member is connected with the second magnetic suction member through magnetic adsorption.

In an optional embodiment, the quick-mounting structure also comprises a first connecting sleeve provided on the first rotary member, and a second connecting sleeve provided on the second rotary member; and the first connecting sleeve is sleeved on the second connecting sleeve, and a friction member is provided between the first connecting sleeve and the second connecting sleeve.

In an optional embodiment, the friction member is made of an elastic material.

In an optional embodiment, the friction member is made of a rubber material.

In an optional embodiment, a damping groove is provided in the outer side wall of the second connecting sleeve and/or in the inner side wall of the first connecting sleeve, and the friction member is provided in the damping groove.

In an optional embodiment, the damping groove is formed in a ring shape, and the circular central axis of the damping groove is coaxial with the central axis of the second connecting sleeve.

In an optional embodiment, the damping groove is provided around the outer side wall of the second connecting sleeve to form a ring shape.

The present disclosure provides a filter, which comprises the rotating groove body and/or the stopper in the quick-mounting structure of any one of the preceding embodiments.

The present disclosure provides an adaptor ring, which comprises the rotating groove body or the stopper in the quick-mounting structure of any one of the preceding embodiments.

The embodiments of the present disclosure have the following advantageous effects:

when the first connecting member is a camera and the second connecting member is a filter, the stopper on the filter can get into the sliding groove in the camera through a notch, and then quick connection between the filter and the camera can be achieved; and through rotating, when the stopper is detached from the sliding groove through the notch, quick separation between the filter and the camera is achieved. The entire process of connection and disassembly is relatively simple and convenient, and is no longer cumbersome, and the operation is quick and efficient, the operating period is shortened and the efficiency is improved.

BRIEF DESCRIPTION OF DRAWINGS

In order to more clearly illustrate technical solutions of embodiments of the present disclosure, accompanying drawings which need to be used in the embodiments will be introduced briefly below, and it should be understood that the accompanying drawings below merely show some embodiments of the present disclosure, therefore, they should not be considered as limitation to the scope, and those ordinarily skilled in the art still could obtain other relevant drawings according to these accompanying drawings, without using any inventive effort.

Figure 1:
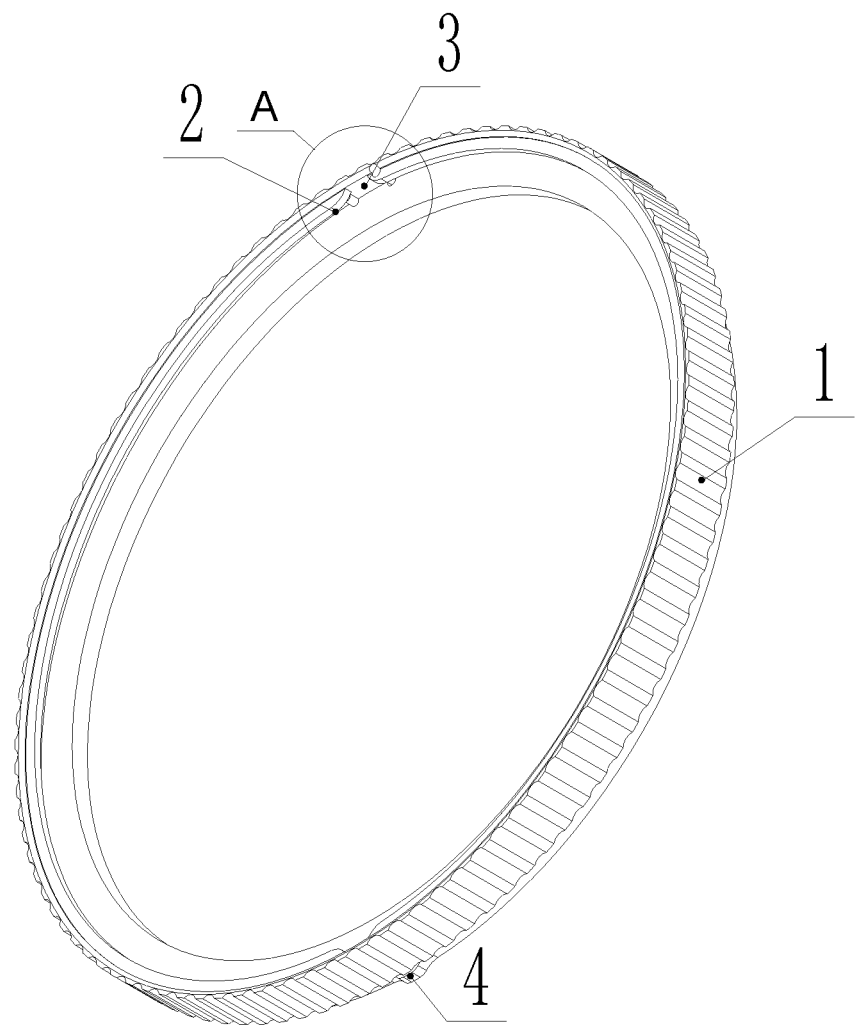
FIG. 1 is a schematic view of the three-dimensional structure of the filter provided in the embodiment of the present disclosure.
Figure 2:
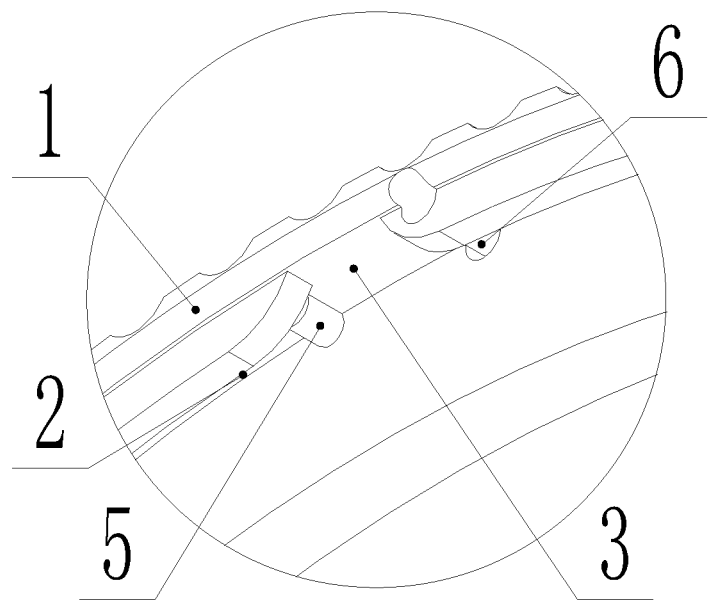
FIG. 2 is a partial enlarged view of portion A in FIG. 1.
Figure 3:
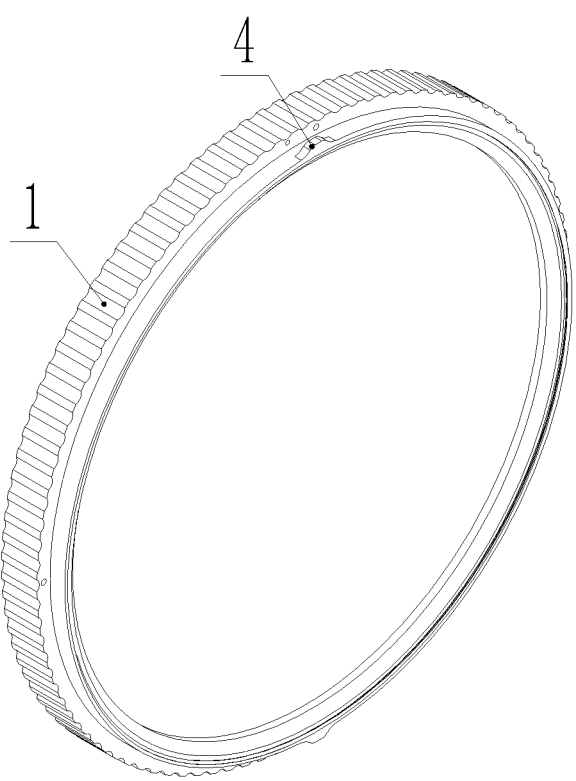
FIG. 3 is a schematic view of the structure of filter at another angle provided in the embodiment of the present disclosure.
Figure 4:
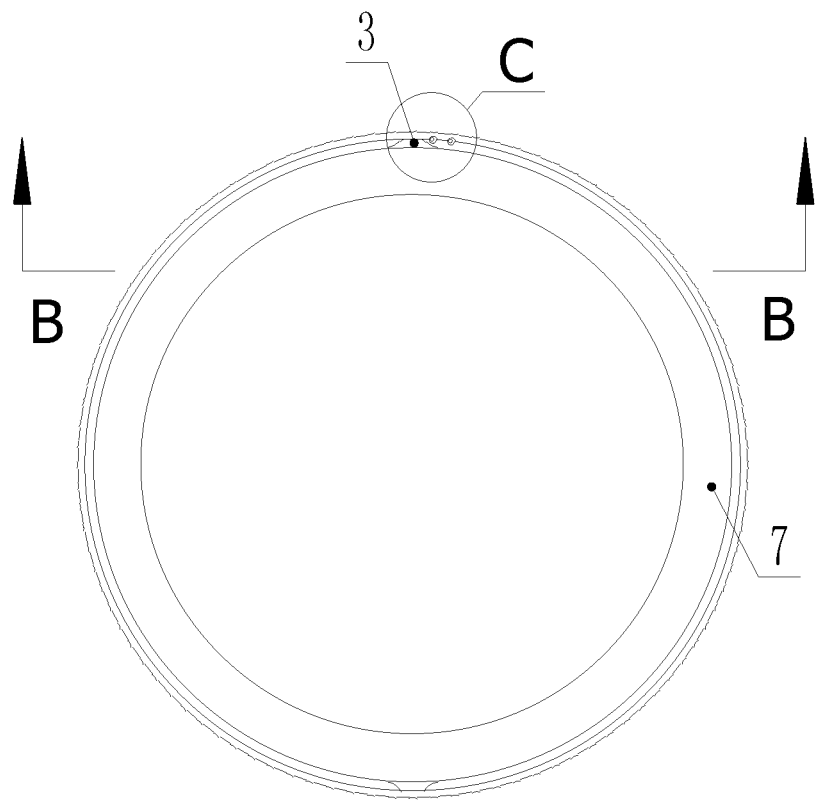
FIG. 4 is a front view of the adaptor ring provided in the embodiment of the present disclosure.
Figure 5:
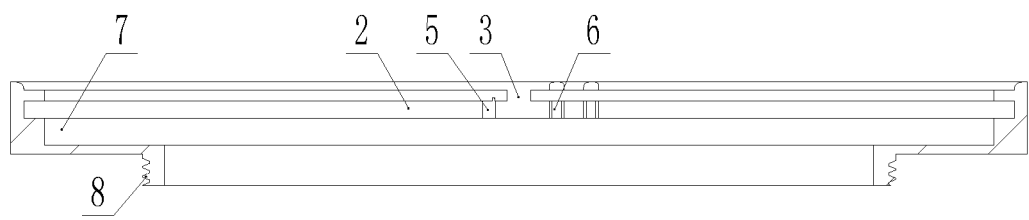
FIG. 5 is a sectional view along B-B in FIG. 4.
Figure 6:
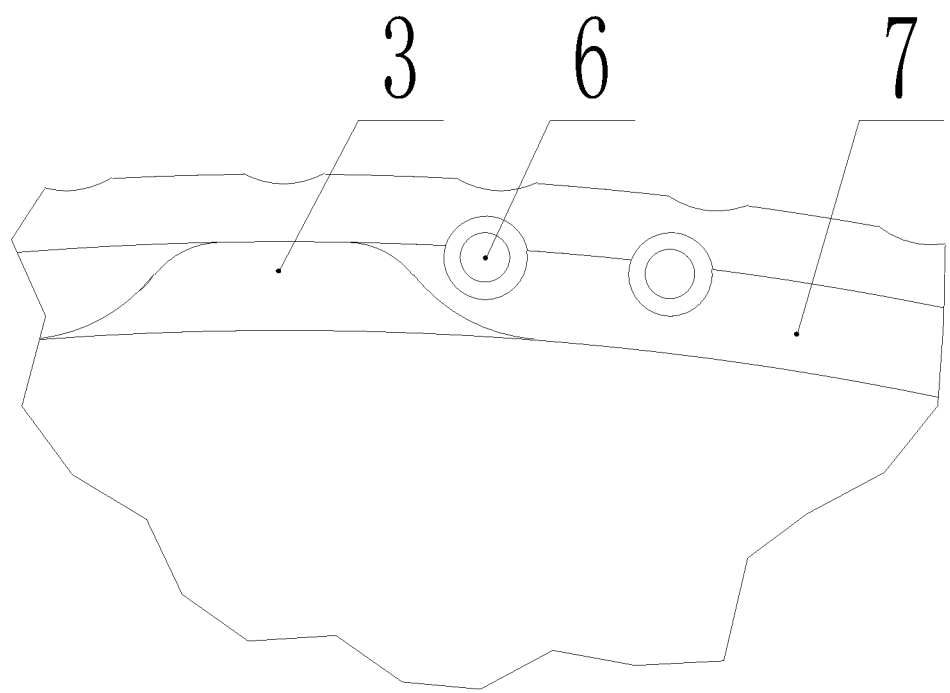
FIG. 6 is a partial enlarged view of portion C in FIG. 4.
Figure 7:
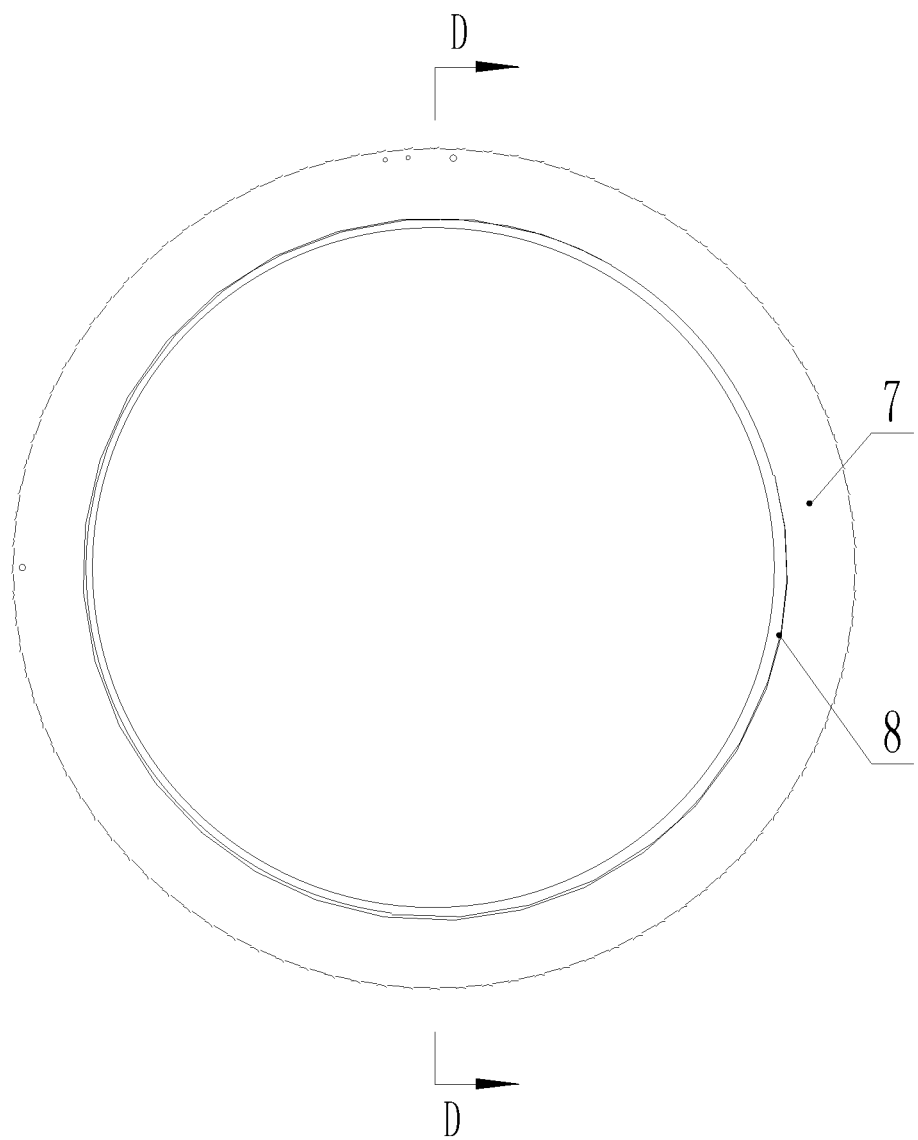
FIG. 7 is a front view of the connecting structure between the filter and the adaptor ring provided in the embodiment of the present disclosure.
Figure 8:
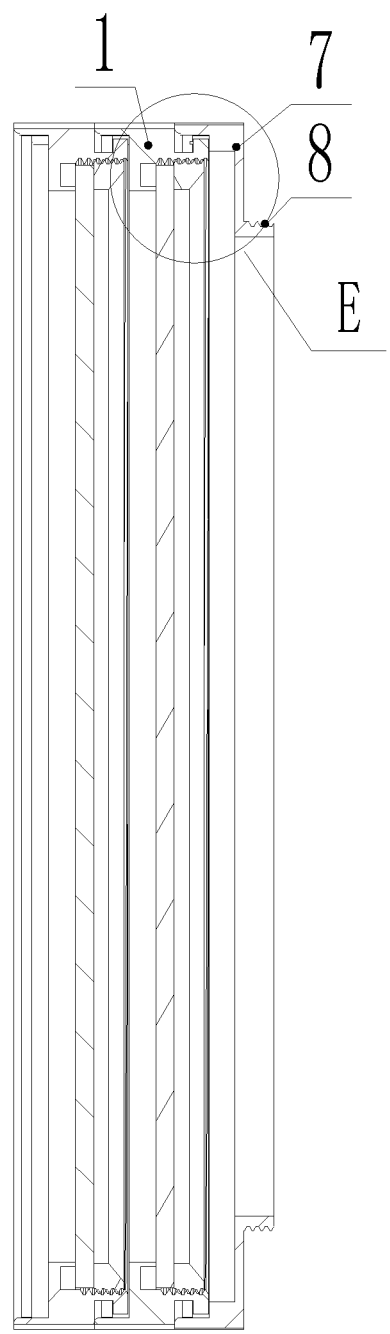
FIG. 8 is a sectional view along D-D in FIG. 7.

Reference signs: 1-filter; 2-sliding groove; 3-notch; 4-stopper; 5-fixing steel bar; 6-elastic steel bar; 7-adaptor ring; 8-external thread; 9-friction member.

DETAILED DESCRIPTION OF EMBODIMENTS

In order to make objects, technical solutions and advantages of the embodiments of the present disclosure clearer, the technical solutions in the embodiments of the present disclosure will be described clearly and completely below in conjunction with accompanying drawings in the embodiments of the present disclosure. Obviously, the described embodiments are only a part of the embodiments of the present disclosure instead of all the embodiments. Usually, the assemblies of the embodiments of the present disclosure described and illustrated in the accompanying drawings herein can be arranged and designed through different arrangements.

Therefore, detailed descriptions for the embodiments of the present disclosure provided in the accompanying drawings are not intended to limit the protection scope of the present disclosure, but merely represent the selected embodiments of the present disclosure. Based on the embodiments of the present disclosure, any other embodiments obtained by those ordinarily skilled in the art without using any inventive efforts should be covered within the scope of protection of the present disclosure.

It should be noted that the same reference signs and letters in the following accompanying drawings indicate the same terms, and therefore, as along as a term is defined in a figure, it need not be further defined or explained in the figures thereafter.

In the description of the present disclosure, it should be noted that the orientation or position relations indicated by the terms "center", "upper", "lower", "left", "right", "vertical", "horizontal" "inner", "outside" and the like are based on the orientation or position relations shown in the accompanying drawings, or the orientation or position relations commonly arranged when the product according to the present disclosure is used, and they are just intended to conveniently describe the present disclosure and simplify the description, and are not intended to indicate or imply that the devices or elements as indicated should have specific orientations or should be configured and operated in a specific orientations, and then should be construed as limitations to the present disclosure. In addition, the terms "first", "second" "third" and the like are only intended for differentiated description and shall not be construed to indicate or imply relative importance.

In addition, the terms "horizontal", "vertical", "overhang" and the like do not mean that the member should be horizontal or overhang absolutely, but it can be slightly inclined. For example, the term of "horizontal" merely indicates that the direction is more "horizontal" with respect to the term "vertical", but it does not mean that the structure should be absolutely horizontal, while it may be slightly inclined.

In the description of the present disclosure, it should also be noted that, unless otherwise clearly specified and defined, terms "provide", "mount" "connect with each other" and "connect" should be understood in a broad sense, for example, they can be a fixed connection, a detachable connection, or an integral connection; they can be a mechanical connection or an electrical connection; they can be a direct connection or an indirect connection through an intermediate medium, and can be the internal communication between two elements. For a person skilled in the art, they may understand the specific meaning of the above-mentioned terms in the present disclosure according to specific circumstances.

The embodiments of the present disclosure will be described below in conjunction with FIGS. 1-10. In the case of no conflict, the following embodiments and the features in the following embodiments can be combined with each other.

The present disclosure provides a quick-mounting structure configured to quickly connect a first connecting member with a second connecting member, wherein the quick-mounting structure comprises:

a rotating groove body, wherein the rotating groove body is provided with a sliding groove therein, a notch is provided in the sidewall of the sliding groove, and the rotating groove body is provided on the first connecting member; and a stopper, wherein the stopper is provided on the second connecting member, and the stopper can get into and out of the sliding groove through the notch.

In the present embodiment, when two members need to be connected with each other, for example, when the first connecting member is a camera and the second connecting member is a filter 1, and when the filter 1 and the camera need to be mounted and dismounted quickly, the stopper 4 on the filter 1 only needs to get into the sliding groove 2 through the notch 3 in the rotating groove body, and then the filter 1 is rotated so that the stopper 4 and the notch 3 are staggered, which prevents the stopper 4 from detaching from the notch 3, and thus the purpose of attaching the filter 1 to the camera can be achieved.

When the filter 1 needs to be dismounted from the camera, it is only necessary to rotate the filter 1, when the stopper 4 is corresponding to the notch 3, the stopper 4 passes through the notch 3 and detaches from the sliding groove 2, and the purpose of dismounting the filter 1 from the camera can be achieved through the separation from the rotating groove body.

The entire process of mounting and dismounting is relatively fast and smooth, and the mounting and dismounting can be conducted as long as the stopper 4 corresponds to the notch 3, which avoids a long dismounting process rendered by long time rotation of threaded connection, shortens the tedious process when the filter 1 is replaced a lot, and enhances efficiency of replacing the filter 1.

In the present embodiment, the rotating groove body is in a ring shape, the sliding groove 2 is provided in the inner side wall of the rotating groove body, and the sliding groove 2 forms a circular groove structure along the inner side wall of the rotating groove body.

Specifically, the notch 3, provided in the sidewall of the sliding groove 2, may have a shape matching with the outer shape of the stopper 4, or a shape not matching with the outer shape of the stopper 4 as long as the stopper 4 can get into the sliding groove 2 through the notch 3.

It should be noted that in the present embodiment description is made using the example that the first connecting member is a camera and the second connecting member is the filter 1, but the first connecting member is not limited to the camera and the second connecting member is not limited to the filter 1, as long as the connection between the two members can be achieved through the cooperation of the sliding groove 2 and the stopper 4.

In an optional embodiment, the sliding 2 is provided with a spacing part therein, wherein the spacing part connects the two oppositely arranged side walls of the sliding groove 2.

In the present embodiments, the spacing part connects the two oppositely arranged side walls of the sliding groove 2, and the sliding groove 2 is partitioned by the spacing part.

In the present embodiment, the number of the spacing parts is at least two, and the arrangement of the two spacing parts achieves a partitioned arrangement of the sliding groove 2, so that the stopper 4 will not detach itself from the partition section when it gets into the partition section which does not communicate with the notch 3, thereby ensuring a stable connection between the first connecting member and the second connecting member.

In the present embodiment, when the number of the spacing parts is more than two, the spacing parts can partition the sliding groove 2 into a plurality of partition sections, and each partition section can define the relative rotating angle between the first connecting member and the second connecting member, and can further regulate the rotating range of the first connecting member and the second connecting member.

When the first connecting member is a camera and the second connecting is the filter 1, different adjustment ranges will bring different adjustment effects to the filter 1.

Specifically, the height of the spacing part is smaller than the depth of the sliding groove 2, or the stopper 4 will not detach itself from the sliding groove 2 when it gets across the spacing part and gets into the partition section.

In the present embodiment, the spacing part can be provided to connect the two oppositely arranged side walls of the sliding groove 2, and it can also be provided on only one of the side walls, or on the bottom of the sliding groove 2, as long as it can separate the sliding groove 2 and prevent the stopper 4 from detaching itself from the sliding groove 2 through the notch 3, through the arrangement of the spacing part.

In an optional embodiment, the spacing part is provided at the two opposite sides of the notch 3.

Specifically, in the present embodiment, after the spacing part is arranged at the two opposite sides of the notch 3, the notch 3 is effectively protected, and furthermore, when the stopper 4 gets into the sliding groove 2 through the notch 3, the first connecting member or the second connecting member is rotated, so that the stopper 4 firstly gets across the spacing part and then can really enter into the sliding groove 2 when the stopper 4 slides into the sliding groove 2, and thus the connection between the first connecting member and the second connecting member is achieved.

In an optional embodiment, the stopper 4 is provided with a curved surface or an inclined surface at two opposite sides, and the stopper 4 can stride over the spacing part by the curved surface or the inclined surface.

Specifically, in the present embodiment, the arrangement of the curved surface or the inclined surface on two sides of the stopper 4 makes the stopper 4 easily stride over the spacing part back and forth, that is, it can stride over and can get back, and thus it is convenient for the stopper 4 to get into the sliding groove 2, and thus can further effectively ensure the limiting function of the rotating groove body to the stopper 4.

In the present embodiment, the stopper 4 can also be arranged with a curved surface or an inclined surface on one side, and at this moment, the regulation of the stopper 4 at different partition sections can also be realized through the one-way rotation of the stopper 4, which can ensure the limiting function of the rotating groove body to the stopper 4, and ensure that the stopper 4 gets across the notch 3 to achieve the mounting between the first connecting member and the second connecting member.

In an optional embodiment, the number of the notches 3 is multiple.

In the present embodiment, the number of the notches 3 is provided to be multiple, so that the functions of connecting and disassembling the first connecting member and the second connecting member after the stopper 4 rotates a small angle.

Specifically, in the present embodiment, the multiple notches 3 are evenly arranged about the rotation center of the rotating groove body as the axis, and furthermore, the stopper 4 may have multiple angles for matching with the positions of the notches 3, so that the mounting and dismounting of the quick-mounting structure is faster and more convenient.

It should be noted that in the present embodiment, the shapes of the notches 3 can be the same, or different from each other, as long as they allow the stopper 4 to pass through.

In the present embodiment, the number of the stopper 4 is one, which can achieve the mounting and dismounting between the first connecting member and the second connecting member when it matches with different notches 3 respectively.

It should be noted that the number of the stopper 4 can be one or multiple, as long as it is not larger than the number of the notches 3, and each stopper 4 is matched with a notch 3, as long as normal fast mounting and fast dismounting of the first connecting member and the second connecting member are ensured.

In an optional embodiment, the spacing part and/or the stopper 4 are of an elastic material.

In the present embodiment, through partitioning the sliding groove 2 into a plurality of partition sections through the spacing parts, when the stopper 4 needs to stride over the spacing part and then gets into different partition sections, the spacing part or the stopper 4 needs to make certain deformation, so that the stopper 4 gets across the spacing part while will not stride over the spacing part by itself, and furthermore, the stopper 4 will not detach itself from the partition section.

In the present embodiment, the spacing part is made of an elastic material; when the second connecting member is rotated, the stopper 4 exerts a certain pressure on the spacing part, which results in a deformation of the spacing part; as the contact surface between the stopper 4 and the spacing part is a curved surface or an inclined surface, under the pressure from the stopper 4, the spacing part deforms towards the bottom of the groove, and the purpose that the stopper 4 gets across the spacing part is finally achieved.

In the present embodiment, the number of the spacing parts is multiple, wherein one or several of them are made of an elastic material, while the rest are not made of the elastic material, and then defining the rotating angle of the second connecting member can be achieved, or defining the rotating direction of the second connecting member is achieved.

In an optional embodiment, the rotating groove body comprises a rotary baffle or a rotary stop lever, wherein a gap is formed between the rotary baffle or the rotary stop lever and the first connecting member, and the gap is the sliding groove 2.

In the present embodiment, the sliding groove 2 arranged in the rotating groove body can be a groove structure provided on itself, or a groove structure produced by the cooperation between the rotating groove body with other members.

Specifically, in the present embodiment, the rotating groove body is the rotary baffle and is fixedly arranged on the first connecting member, and a certain gap is formed between the rotary baffle and the first connecting member; the rotary baffle is provided with a notch 3 therein, and through the notch 3, the stopper 4 can enter into the gap between the rotary baffle and the first connecting member; and furthermore, through the rotating of the second connecting member, the stopper 4 slides in the gap, and the rotary baffle achieves blocking and limiting the stopper 4.

In the present embodiment, the rotary baffle can be connected with the first connecting member through the spacing part.

In an optional embodiment, the first connecting member is further provided with a first magnetic suction member thereon, and the second connecting member is provided with a second magnetic suction member thereon; and the first magnetic suction member is connected with the second magnetic suction member through magnetic adsorption.

In the present embodiment, the first magnetic suction member is magnet, while the second magnetic suction member is an iron metal. When the stopper 4 on the second connecting member enters into the sliding groove 2 through the notch 3 in the first connecting member, the first magnetic suction member and the second magnetic suction member will be adsorbed to each other due to the magnetic properties, and the first connecting member and the second connecting member adsorbed to each other will not affect their rotation, and then the stopper 4 can enter into the partition section through rotating the second connecting member.

As a result, under the effect of the first magnetic suction member and the second magnetic suction member, the separation between the first connecting member and the second connecting member can be avoided, and through the arrangement of the spacing part, the relative rotating angle between the first connecting member and the second connecting member can be reduced.

In other words, under the effect of the first magnetic suction member and the second magnetic suction member, and under the effect of the rotating groove body and the stopper 4, stable connection between the first connecting member and the second connecting member can be ensured.

It should be noted that in the present embodiment, the first magnetic suction member is magnet, and the second magnetic suction member is an iron metal, but it is not limited to the above arrangement method, it may also be the situation that the first magnetic suction member is an iron metal and the second magnetic suction member is magnet, or both of the first magnetic suction member and the second magnetic suction member are an iron metal, in other words, as long as the first connecting member and the second connecting member can be connected by the magnetic adsorption method, and the stopper 4 can be prevented from detaching itself from the sliding groove 2 when the stopper 4 is at the position of the notch 3.

In the present embodiment, the magnet can also be electromagnet, or natural magnet, as long as it can produce magnetic properties to achieve the magnetic adsorption between the first connecting member and the second connecting member.

Figure 9:
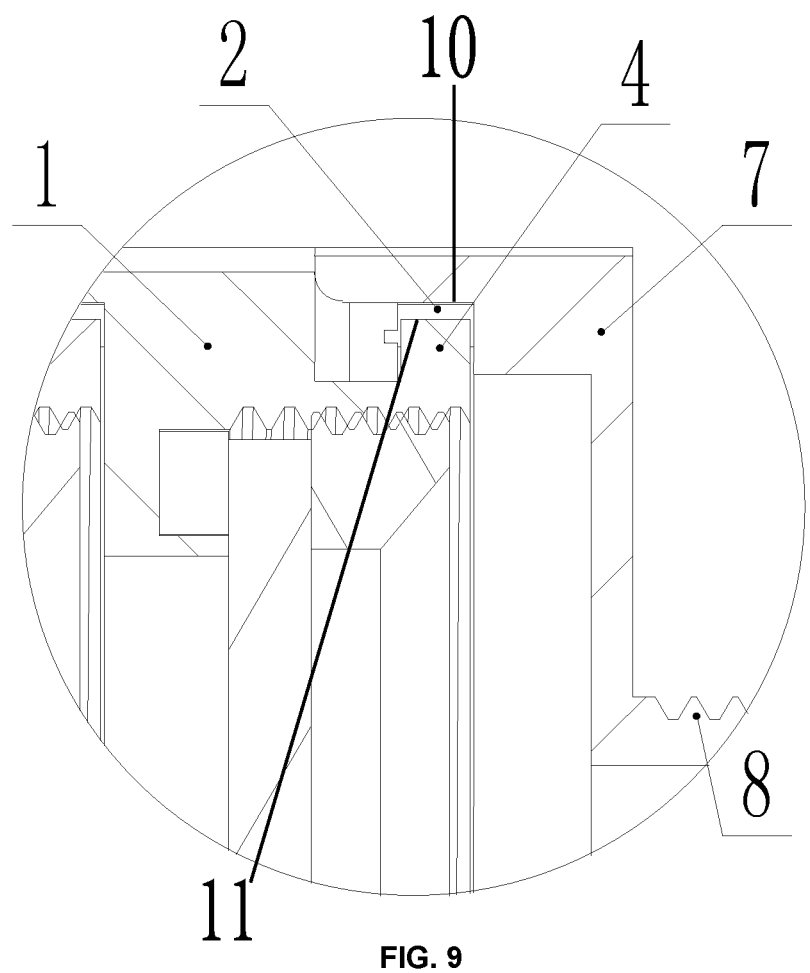
FIG. 9 is a partial enlarged view of portion E in FIG. 8.
Figure 10:
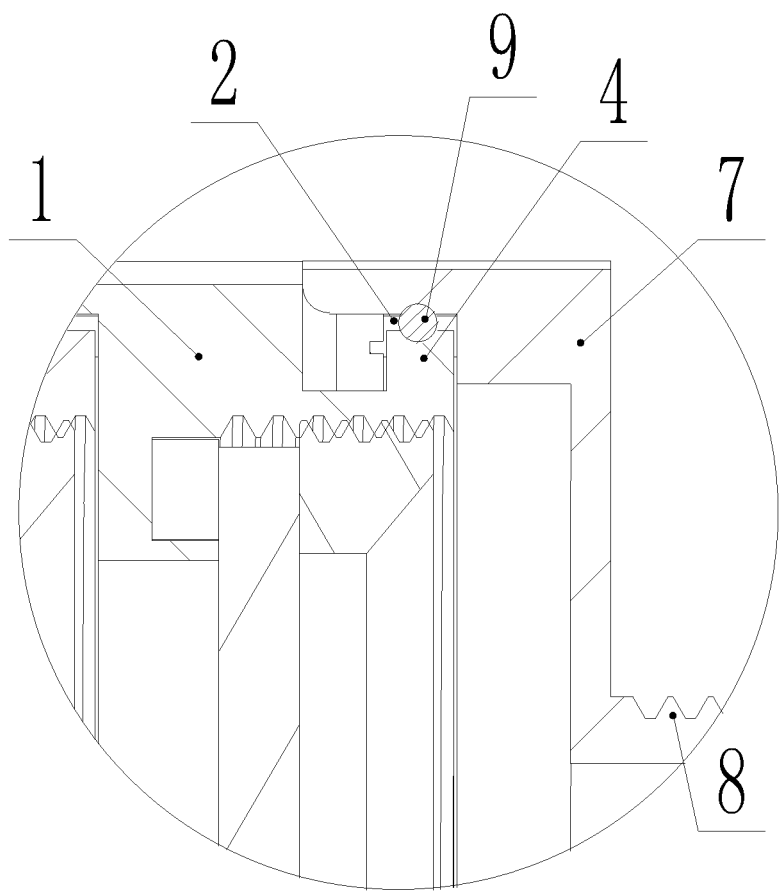
FIG. 10 is another schematic view of the structure of the partial enlarged view of portion E in FIG. 8.

In an optional embodiment, as shown in FIG. 10, the quick-mounting structure further comprises a first connecting sleeve 10 provided on the first rotary member, and a second connecting sleeve 11 provided on the second rotary member; and the first connecting sleeve 10 is sleeved on the second connecting sleeve, and a friction member 9 is provided between the first connecting sleeve 10 and the second connecting sleeve. Although FIG. 10 does not show the first and second connecting sleeves, there positions are as illustrated in FIG. 9.

Specifically, in the present embodiment, the first connecting sleeve 10 provided on the first rotary member, and the second connecting sleeve 11 provided on the second rotary member; and the second connecting sleeve 11 is inserted into the first connecting sleeve, i.e., the first connecting is connected with the second connecting sleeve 11 by a sleeving method. As the friction member 9 is provided between the first connecting sleeve 10 and the second connecting sleeve, the frictional force between the two members can be increased, and the positioning between the first connecting sleeve 10 and the second connecting sleeve 11 can be further achieved through the function of the frictional force, i.e., through a damping effect generated by the frictional force between the first connecting sleeve 10 and the second connecting sleeve, the connection between the first rotary member and the second rotary member is achieved.

Since a certain damping effect is generated between the first connecting sleeve 10 and the second connecting sleeve, when the second rotary member rotates with respect to the first rotary member, a certain resistance will be generated, and then a certain hand feeling is generated, and this makes it convenient for an operator to control the rotary position.

In the present embodiment, the friction member 9 is made of an elastic material.

Specifically, in the present embodiment, the friction member 9 is made of a rubber material.

Through extruding the rubber material with certain elasticity, the second connecting sleeve 11 is inserted into the first connecting sleeve, thereby connecting the first rotary member and the second rotary member.

It should be noted that in the present embodiment, the friction member 9 is made of a rubber material, but it is not limited to rubber, and it can also be other materials, as long as the material has certain elasticity and can form a friction damping between the first connecting sleeve 10 and the second connecting sleeve.

In an optional embodiment, a damping groove is provided in the outer side wall of the second connecting sleeve 11 and/or in the inner side wall of the first connecting sleeve 10, and the friction member 9 is provided in the damping groove.

Specifically, in the present embodiment, there are three methods for arranging the damping groove.

The first method is that the damping groove is independently provided in the inner side wall of the first connecting sleeve 10, the friction member 9 is partially exposed in the damping groove and the exposed portion is abutted with the outer side wall of the second connecting sleeve 11, and then the action damping between the second connecting sleeve 11 and the first connecting sleeve 10 is achieved.

The second method is that the damping groove is independently provided in the outer side wall of the second connecting sleeve 11, the friction member 9 is partially exposed in the damping groove and the exposed portion is abutted with the inner side wall of the first connecting sleeve 10, and then the action damping between the second connecting sleeve 11 and the first connecting sleeve 10 is achieved.

The third method is that the damping groove is respectively provided in the inner side wall of the first connecting sleeve 10 and the outer side wall of the second connecting sleeve 11, wherein the friction member 9 is firstly provided in the damping groove on the first connecting sleeve 10, or the friction member 9 is firstly provided in the damping groove on the second connecting sleeve 11, when the second connecting sleeve 11 is inserted into the first connecting sleeve 10, and the damping groove in the second connecting sleeve 11 is disposed corresponding to the damping groove in the first connecting sleeve 10, the friction member 9 is divided into two parts which are respectively provided in the damping groove in the first connecting sleeve 10 and in the damping groove in the second connecting sleeve 11, which further increases the connection stability between the first connecting sleeve 10 and the second connecting sleeve 11, effectively reduces a risk that the second connecting sleeve 11 detaches itself from the first connecting sleeve 10, and this will not affect the relative rotation between the second connecting sleeve 11 and the first connecting sleeve 10, i.e., it does not affect the rotation of the second rotary member with respect to the first rotary member.

In an optional embodiment, the damping groove is formed in a ring shape, and the circular central axis of the damping groove is coaxial with the central axis of the second connecting sleeve.

Specifically, in the present embodiment, the damping groove is provided around the outer side wall of the second connecting sleeve 11 to form a ring shape. At the moment, the friction member 9 is circularly sleeved on the second connecting sleeve 11 and provided inside the damping groove.

Such an arrangement not only achieves the relative stability between the second connecting sleeve 11 and the first connecting sleeve 10, but also ensures the stability of the friction member 9 inside the damping groove.

Specifically, in the present embodiment, the friction member 9 is an O-shaped rubber ring.

It should be noted that the friction member 9 may be an O-shaped rubber ring, but is not limited to the O-shaped rubber ring, as long as the damping effect can be achieved.

In the present embodiment, the friction member 9 can not only stabilize the first connecting sleeve 10 and the second connecting sleeve 11, but also seal the gap between the first connecting sleeve 10 and the second connecting sleeve.

The present disclosure provides a filter, comprising the rotating groove body and/or the stopper in the quick-mounting structure of any one of the preceding embodiments.

Specifically, in the present embodiment, the two opposite ends of the filter 1 are respectively used as a first connecting member and a second connecting member, i.e., the rotating groove body is provided at one end of the filter 1 and a stopper 4 is provided at the other end thereof.

Such an arrangement can achieve fast connection and fast dismounting among multiple filters 1.

Specifically, in the present embodiment, there is a boss respectively below and above one end of the filter 1 which is used as the stopper 4; there is a rotating groove body at the other end of the filter, and the rotating groove body has an inner circular groove in the inner side as a sliding groove 2, and there is a notch 3 respectively in the upper part and the lower part of the sliding groove 2, wherein a fixing steel bar 5 is mounted on the left side of one of the notches 3 as a spacing part, an elastic steel bar 6 is mounted at the right side of the notch 3 as the spacing part, and a fixing steel bar 5 is also provided in the 90° direction on the right side of the notch 3 as a spacing part; the elastic steel bar 6 and the fixing steel bar 5 are pressed in the corresponding holes of a lens fixing frame, the elastic steel bar 6 is tightly matched and fixed with the bottom of the lens fixing frame at one end and is reserved with an elastic space at the other end; the fixing steel bar 5 is tightly matched and fixed with the entire lens fixing frame without leaving any moving space; curved magnets are evenly arranged in the circular groove inside the lens fixing frame; the lens is attached to the upper surface of the circular groove inside the lens fixing frame on one face, and is locked and fixed by the thread of the fixing ring of the lens on the other face.

Specifically, in the present embodiment, the arrangement can also be that a damping groove is provided in the inner side wall of the rotating groove body at one end of the filter 1, and at this moment, the rotating groove body is equivalent to the first connecting sleeve; the filter 1 is provided with the second connecting sleeve 11 at the other end, the second connecting sleeve 11 is provided with the damping groove and the stopper 4 thereon, and the friction member 9 is provided inside the damping groove, to achieve the effect of fixing the two filters through friction.

The present disclosure provides an adaptor ring, comprising the rotating groove body or the stopper in the quick-mounting structure of any one of the preceding embodiments.

In the present embodiment, most of the cameras in the prior art are connected with the filter 1 through a threaded mouth, and therefore, when the cameras in the prior art need to use the filter 1 with the quick-mounting structure in the present technical solution, the replacement of the interface needs to be conducted through an adaptor ring 7.

Specifically, in the present embodiment, the adaptor ring 7 is provided with an external thread 8 at one end, which is matched with the camera, and the other end of the adaptor is used as the first connecting member or the second connecting member, i.e., the adaptor ring 7 is provided with the sliding groove 2 in the other end, or the adaptor ring 7 is provided with the stopper 4 at the other end.

The above arrangement achieves that the adaptor ring 7 can be connected to the camera in the prior art at the one end, and connected with the filter 1 with the quick-mounting structure at the other end, and then function of fast mounting and dismounting is achieved.

Specifically, in the present embodiment, the adaptor ring 7 has the external thread 8 at the one end, configured to fix it to the lens of the camera; the adaptor ring 7 is provided with the sliding groove 2 in the inner side at the other end, there is a notch 3 respectively in the upper part and the lower part of the sliding groove 2, and an open outer circular groove is provided at outer side thereof, wherein one of the notches 3 is mounted with the fixing steel bar at the left side, and is mounted with two elastic steel bars 6 at the right side, and a fixing steel bar 5 is further provided at a position at 90° to the right side;

the elastic steel bar 6 and the fixing steel bar 5 are pressed in the corresponding holes of the adaptor ring 7, the elastic steel bar 6 is tightly matched and fixed with the bottom of the adaptor ring 7, and an elastic space is reserved in the other end; the fixing steel bar 5 is tightly matched and fixed with the adaptor ring 7 integrally without leaving any moving space.

When the filter 1 with the quick-mounting structure is connected to the adaptor ring 7, and the filter 1 is close to the adaptor ring 7, under the force of the magnet, the filter 1 and the adaptor ring 7 are mutually adsorbed, and the filter 1 is adsorbed to the adaptor ring 7, thereby achieving a positioning function, and at the moment, the filter 1 will not fall off even if one looses hand; when the filter 1 is rotated, and when the stopper 4 is rotated to be aligned with the notch 3 in the inner groove of the adaptor ring 7, under the magnetic force, the stopper 4 slides into the sliding groove 2, and at this time, when the filter 1 is rotated counterclockwise, it is blocked by the fixing steel bar 5 and cannot be rotated; when the stopper 4 is rotated clockwise and squeezed through the first elastic steel bar 6, it has a temporary positioning function, and then the stopper 4 is further rotated and is squeezed through the second elastic steel bar 6, it can freely rotate in the sliding groove 2 to another fixing steel bar 5 or the other side of the fixing steel bar 5.

When the filter 1 needs to be removed, the filter 1 is rotated counterclockwise; when the stopper 4 is squeezed through the two elastic steel bars 6, it is stopped by the fixing steel bar 5, and at this time, the filter 1 can be pulled out by pushing outwardly. This method can also be applied to the mounting between one filter 1 and another filter 1.

When the filter 1 is mounted on the adaptor ring 7, and when the boss squeezes through the first elastic steel bar 6, it is temporary positioned; another filter 1 is continuously mounted on the filter 1, when the filter 1 at the outer side is rotated, the filter 1 at the inner side is temporarily positioned and will not be brought to rotate, and interference of the elastic steel bar 6 on the adaptor ring 7 is larger than that of the elastic steel bar 6 of the filter 1, and thus, the filter 1 at the outer side can be mounted and dismounted and rotated arbitrarily, and will not drive the filter 1 at the inner side to rotate.

The embodiments of the present disclosure have the following advantageous effects:

when the first connecting member is a camera and the second connecting member is the filter 1, the stopper 4 on the filter 1 can get into the sliding groove 2 on the camera through the notch 3, and then the fast connection between the filter 1 and the camera is achieved, and through further rotating, when the stopper 4 detaches itself from the sliding groove 2 through the notch 3, fast separation between the filter 1 and the camera is achieved. The entire process of connecting and dismounting is relatively simple and convenient and is no longer cumbersome, and the operation is quick and effective, and the operating period is shortened and the efficiency is improved.

The above-mentioned are merely for some preferred embodiments of the present disclosure and not intended to limit the present disclosure, and for one skilled in the art, various modifications and changes may be made to the present disclosure. Any modifications, equivalent substitutions, improvements and so on made within the spirit and principle of the present disclosure should be covered within the scope of protection of the present disclosure.

INDUSTRIAL APPLICABILITY

The quick-mounting structure, the adaptor ring and the filter provided by the present disclosure can make the replacement of the filter simpler and faster.

What is claimed is:

1. A quick-mounting structure, wherein the quick-mounting structure is configured to quickly connect a first connecting member with a second connecting member and comprises:
   a rotating groove body, wherein the rotating groove body is provided with a sliding groove, a notch is provided in a side wall of the sliding groove, and the rotating groove body is provided on the first connecting member; and
   a stopper, wherein the stopper is provided on the second connecting member, and the stopper is able to get into and out of the sliding groove through the notch;
   the quick-mounting structure further comprising a first magnetic suction member provided on the first connecting member, and a second magnetic suction member provided on the second connecting member,
   wherein the first magnetic suction member is connected with the second magnetic suction member through magnetic adsorption.

2. The quick-mounting structure according to claim 1, wherein the sliding groove is provided therein with a spacing part, and the spacing part is connected to two oppositely arranged side walls of the sliding groove.

3. The quick-mounting structure according to claim 2, wherein the spacing part is provided at two opposite sides of the notch.

4. The quick-mounting structure according to claim 2, wherein a curved surface or an inclined surface is provided at two opposite sides of the stopper, and the stopper is configured to stride over the spacing part by the curved surface or the inclined surface.

5. The quick-mounting structure according to claim 2, wherein a curved surface or an inclined surface is provided on one side surface of the stopper.

6. The quick-mounting structure according to claim 2, wherein multiple notches are provided.

7. The quick-mounting structure according to claim 2, wherein the spacing part and/or the stopper are/is made of an elastic material.

8. The quick-mounting structure according to claim 1, wherein the rotating groove body is a rotary baffle or a rotary stop lever,
   wherein a gap is formed between the rotary baffle or the rotary stop lever and the first connecting member, and the gap is the sliding groove.

9. The quick-mounting structure according to claim 1, further comprising a first connecting sleeve provided on the first connecting member, and a second connecting sleeve provided on the second connecting member,
   wherein the first connecting sleeve is in sleeving connection with the second connecting sleeve, and
   a friction member is provided between the first connecting sleeve and the second connecting sleeve.

10. The quick-mounting structure according to claim 9, wherein the friction member is made of an elastic material.

11. The quick-mounting structure according to claim 9, wherein the friction member is made of a rubber material.

12. The quick-mounting structure according to claim 9, wherein a damping groove is provided in an outer side wall of the second connecting sleeve and/or in an inner side wall of the first connecting sleeve, and the friction member is provided in the damping groove.

13. The quick-mounting structure according to claim 12, wherein the damping groove is formed in a ring shape, and a circular central axis of the damping groove is coaxial with a central axis of the second connecting sleeve.

14. The quick-mounting structure according to claim 13, wherein the damping groove is provided around the outer side wall of the second connecting sleeve, so as to form a ring shape.

15. A filter, comprising the rotating groove body and/or the stopper in the quick-mounting structure according to claim 1.

16. The filter according to claim 15, wherein the sliding groove is provided therein with a spacing part, and the spacing part is connected to two oppositely arranged side walls of the sliding groove.

17. The filter according to claim 16, wherein the spacing part is provided at two opposite sides of the notch.

18. The filter according to claim 16, wherein a curved surface or an inclined surface is provided at two opposite sides of the stopper, and the stopper is configured to stride over the spacing part by the curved surface or the inclined surface.

19. An adaptor ring, comprising the rotating groove body or the stopper in the quick-mounting structure according to claim 1.

* * * * *